Oct. 4, 1949.    V. R. BENNETT    2,483,722
OXYGEN VALVE

Filed May 2, 1945    7 Sheets-Sheet 1

INVENTOR
V. RAY BENNETT,
BY Stuart M. Maule
ATTORNEY.

Oct. 4, 1949.  V. R. BENNETT  2,483,722
OXYGEN VALVE
Filed May 2, 1945  7 Sheets-Sheet 2

INVENTOR
V. RAY BENNETT,
BY Stuart M. Maule
ATTORNEY.

Oct. 4, 1949.    V. R. BENNETT    2,483,722
OXYGEN VALVE
Filed May 2, 1945    7 Sheets-Sheet 3

INVENTOR
V. RAY BENNETT,
BY Stuart M. Maule
ATTORNEY.

Oct. 4, 1949.　　　　V. R. BENNETT　　　　2,483,722
OXYGEN VALVE

Filed May 2, 1945　　　　　　　　　　　　7 Sheets-Sheet 4

INVENTOR
V. RAY BENNETT,
BY Stuart W. Maule
ATTORNEY.

Oct. 4, 1949.  V. R. BENNETT  2,483,722
OXYGEN VALVE
Filed May 2, 1945  7 Sheets-Sheet 5

INVENTOR
V. RAY BENNETT,
BY Stuart M. Maule
ATTORNEY.

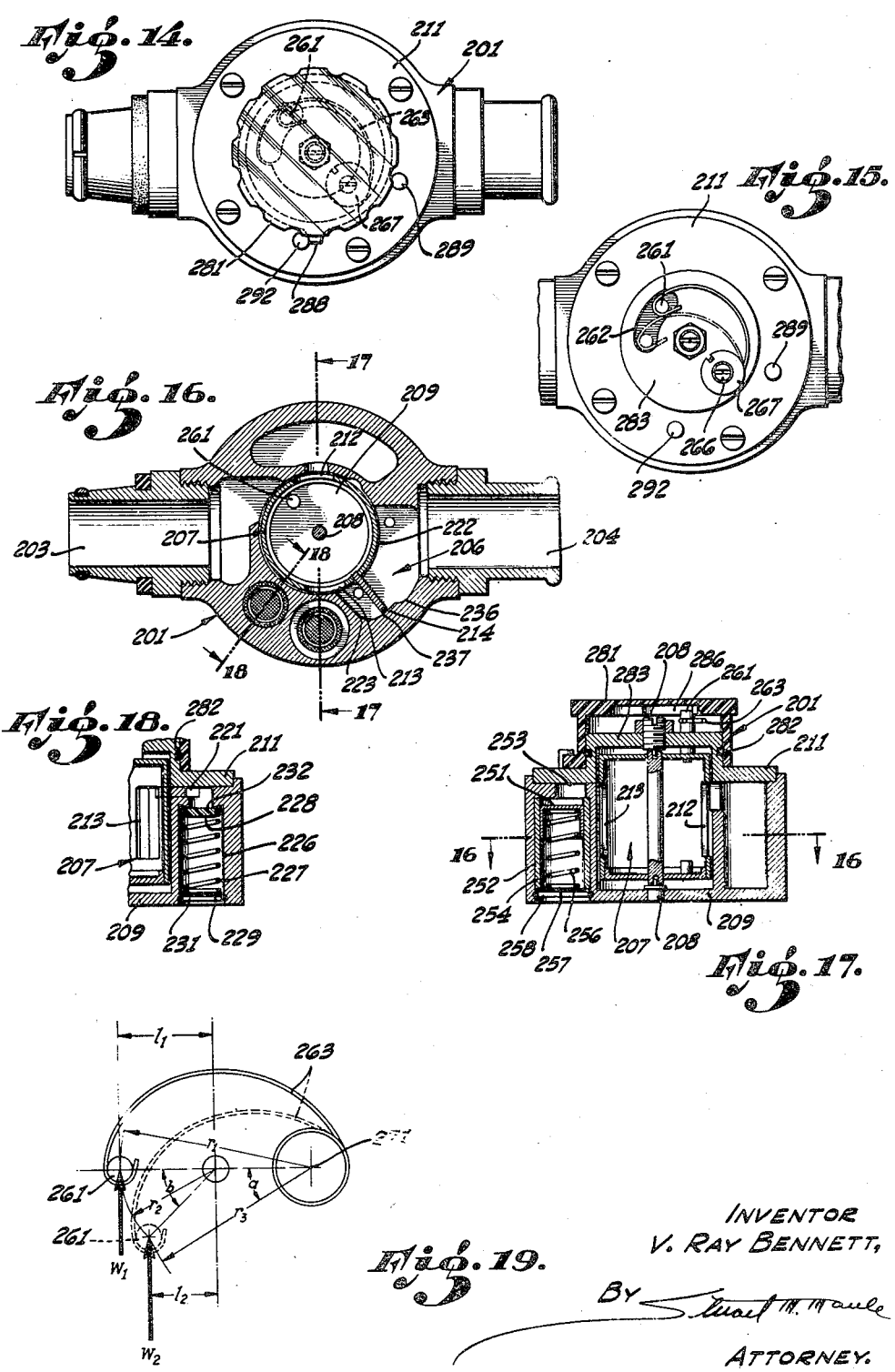

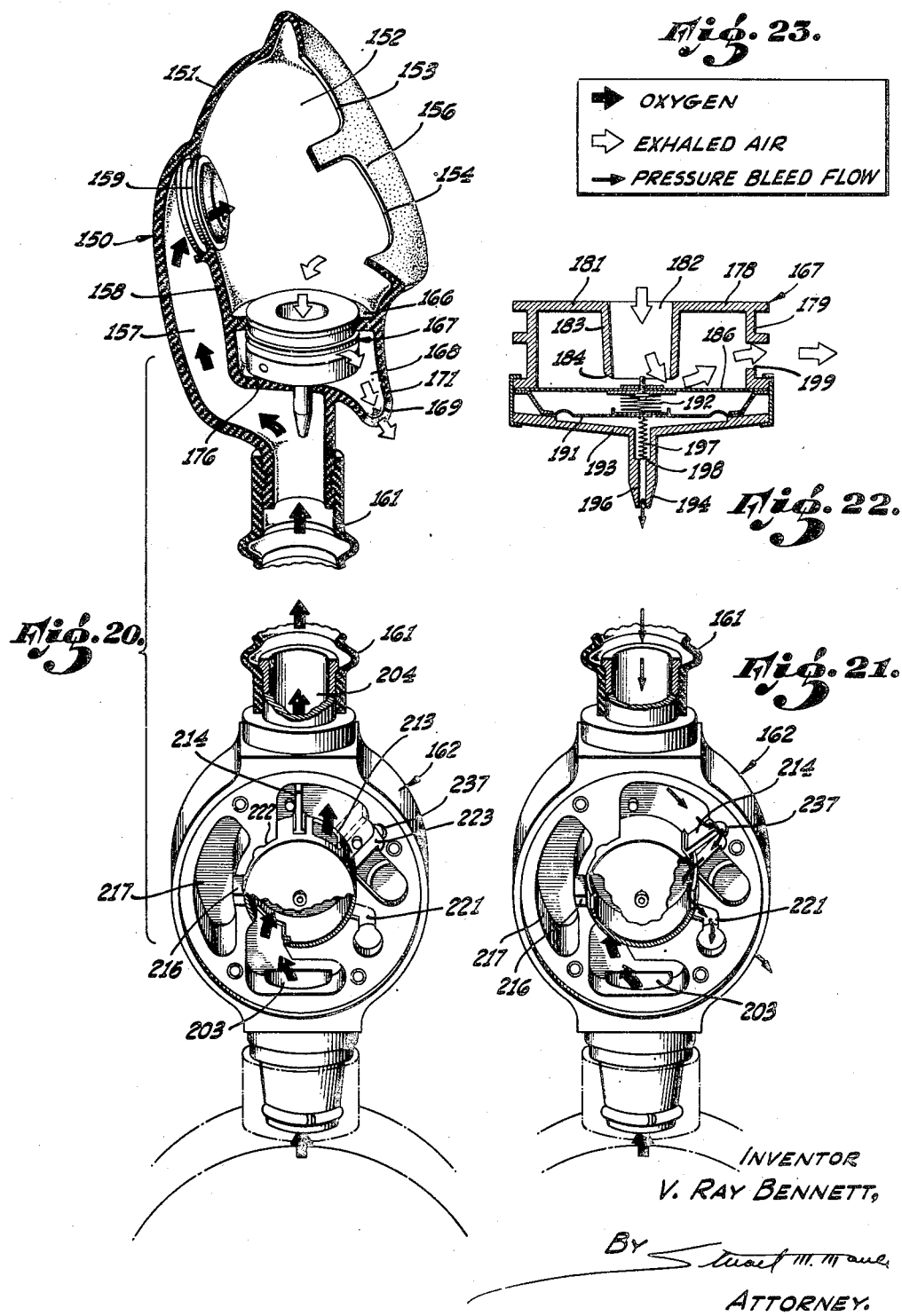

Patented Oct. 4, 1949

2,483,722

UNITED STATES PATENT OFFICE 2,483,722

OXYGEN VALVE

Vivian Ray Bennett, Pasadena, Calif.

Application May 2, 1945, Serial No. 591,571

16 Claims. (Cl. 137—153)

This invention relates to pressure-breathing demand oxygen equipment of the type commonly employed in aircraft operating at altitudes above 35,000 feet.

The equipment whereby oxygen is made available to a subject at substantially the pressure of the ambient atmosphere and in such a manner that he is enabled to inhale the oxygen at will is called "demand" oxygen equipment, and by its use aircraft can ascend to approximately 35,000 feet without any appreciable reduction in the blood oxygen saturation of its personnel. Further, by the use of apparatus of this general type, aircraft can ascend to approximately 40,000 feet without development of anoxia to the extent which jeopardizes routine operation. Above 40,000 feet, however, the atmospheric pressure is so low that even if the subject is breathing 100 per cent pure oxygen, the saturation of oxygen within the blood falls below the 85 per cent value which, it has been determined, is the percentage of saturation below which a subject will experience undue fatigue and errors of judgment to such an extent that only in the case of extreme emergency should aircraft the personnel of which is equipped with demand oxygen apparatus ascend to a higher altitude. For this reason it has been customary, particularly in the operation of war planes to provide the personnel with apparatus whereby oxygen is supplied under positive pressure, oftentimes as great as that corresponding to twenty-two millimeters of mercury. However, the use of apparatus of this latter type is very objectionable to those using it for the reason that it requires exhalation against the positive pressure at which the oxygen is being supplied, thus requiring muscular effort on the part of the user to force the gases being exhaled from his lungs at pressure slightly in excess of that of the supplied oxygen; and this muscular effort in addition to being uncomfortable and fatiguing, has been found to detract to a serious degree from the efficiency of the user in the performance of his duties in connection with manipulation of the aircraft and its equipment.

It is an object of the present invention, therefore, to provide an improvement in pressure-breathing demand oxygen equipment whereby that equipment is enabled to supply oxygen or other suitable gas to a subject at positive pressure and permit him to exhale at pressure less than that at which the gas is being supplied to him.

A further object in this connection is to provide the improvement in pressure-breathing demand oxygen equipment referred to in the form of auxiliary valve of small size and light weight which is adapted to be interposed into the tubing leading to the oxygen mask, with the result that by means of the valve of the present invention the pressure-breathing demand oxygen equipment now extensively in use can be converted into the so-called intermittent pressure-breathing demand oxygen equipment whereby the subject is enabled to expirate at pressure less than that at which the oxygen or other suitable gas is being supplied to him.

Another object is to provide an intermittent pressure-breathing valve or "IPB" valve, as it has become known, wherein the rate of the breathing cycle is not forced by mechanical or by pressure action, but is entirely under the subconscious control of the subject himself, i. e., the valve is operative without requiring any conscious effort on the part of the subject, but merely as the result of the normal, involuntary muscular activity of the subject which accompanies normal breathing.

A further object is to provide means for adjusting the valve whereby the pressure at which exhalation takes place can be regulated to any desired value above the pressure of the ambient atmosphere.

A further object of the present invention is to provide a modified form of IPB valve of the general character described which is of such design and which is adapted for use in such association with a conventional oxygen mask having the exhalation valve incorporated into the mask itself, that exhaled gases instead of passing through the IPB valve, are liberated directly to the ambient atmosphere, through the exhalation valve, thus eliminating the hazard of freezing of the moisture of the breath within the IPB valve. This modification of the present invention, therefore, is best suited for use at those extremely high altitudes where freezing of the breath moisture presents a serious hazard to the satisfactory operation of the oxygen administering equipment.

It is a further object of the present invention to provide an intermittent pressure-breathing valve of the general character indicated which, while having been designed primarily for use in connection with pressure-breathing demand oxygen equipment for use in high altitude aircraft, is also applicable with great advantage to equipment for administering oxygen and other gases in the therapeutic treatment of various diseases such as bronical asthma, pulmonary edema, coronary thrombosis, coronary sclerosis, pneumonia, and numerous other physical ailments which have been found to be benefited by inhalational therapy.

Another object in this same connection is to provide an intermittent pressure breathing valve as described wherein the pressure at which the subject can exhale can be regulated to any desired value from ambient atmospheric pressure to and even above the pressure at which gas is being supplied inasmuch as it has been found therapeutically advantageous in the treatment of certain diseases to require the patient to exhale at pressures considerably in excess of the pressures at which oxygen or other gas is being administered.

A further object is to provide an intermittent pressure-breathing valve as described which is possessed of a minimum number of moving parts and which is otherwise of simple, rugged design as to minimize any tendency for it to become unduly worn or unserviceable and undependable for any other reason.

The invention possesses other objects and valuable features, some of which, with those enumerated, will be set forth in the following description of the preferred embodiment of my invention illustrated in the drawing accompanying and forming a part of the specification. It is to be understood that I do not limit myself to the showing made by said drawing and description but that I may adopt variations of the preferred form within the scope of my invention as defined by the claims.

Referring to the drawings.

Figures 1, 2:
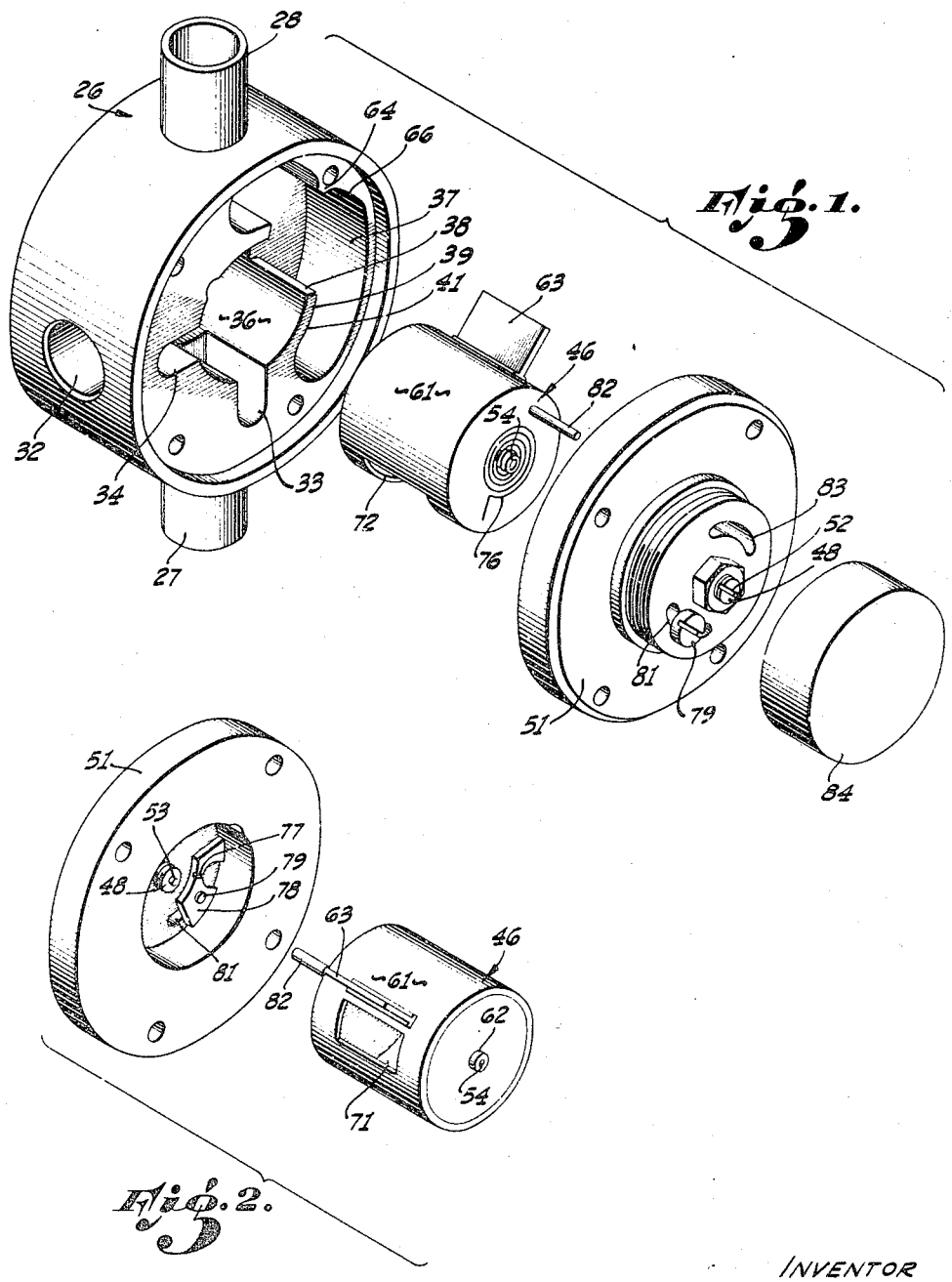
Figure 1 is an exploded perspective view of an intermittent pressure-breathing valve incorporating the principles of the present invention.
Figure 2 is an exploded perspective view of only the cover plate and movable valve core of the apparatus illustrated in Figure 1, illustrating the opposite sides of these two elements from those illustrated in that figure.
Figure 4:
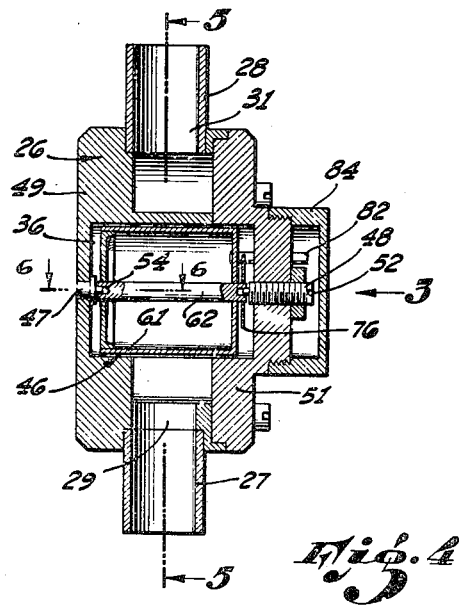
Figure 4 is a longitudinal, vertical sectional view taken upon the line 4—4 of Figure 3 with the direction of view as indicated.
Figure 3:
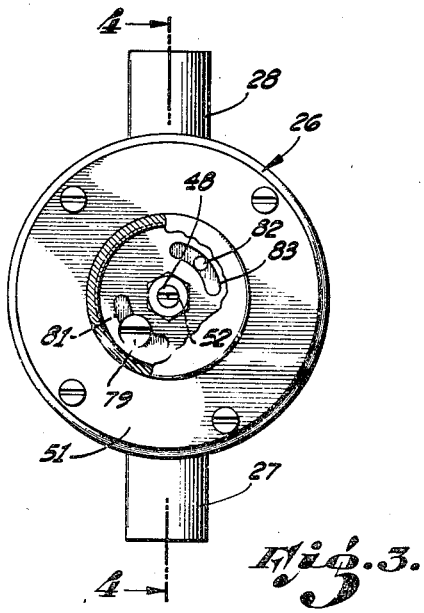
Figure 3 is a view in side elevation of the intermittent pressure-breathing valve of Figure 1, portions of the figure being broken away to better reveal some of the internal construction.
Figure 5:
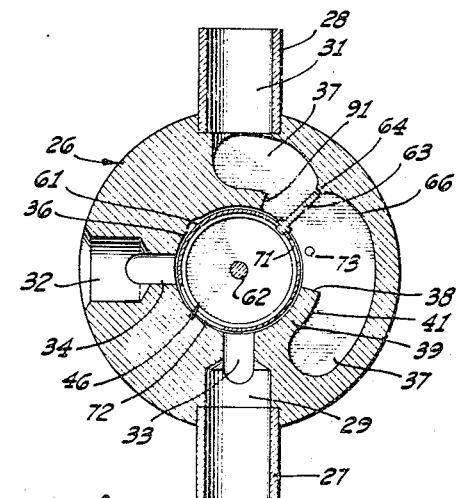
Figure 5 is a transverse vertical sectional view taken upon the line 5—5 of Figure 4 with the direction of view as indicated.
Figure 6:
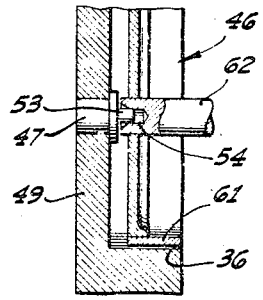
Figure 6 is an enlarged detailed view illustrating the manner of pivotal suspension of the movable valve core. This figure may be considered a horizontal sectional view taken upon the line 6—6 of Figure 4 with the direction of view as indicated.
Figure 8:
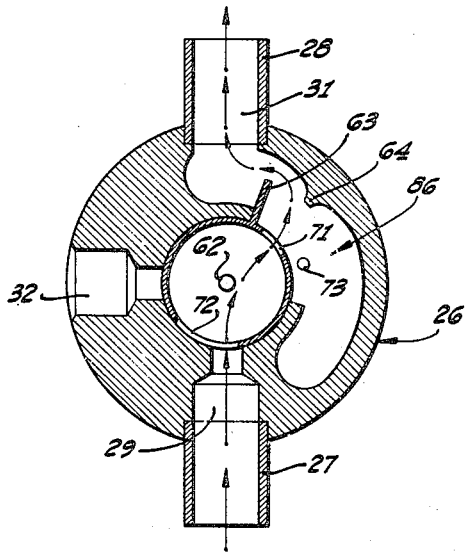
Figure 9:
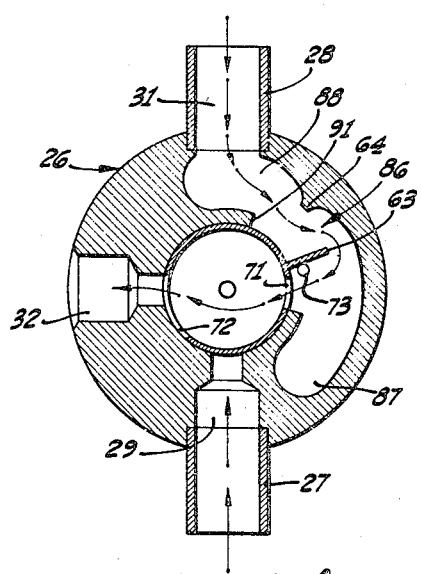
Figure 7:
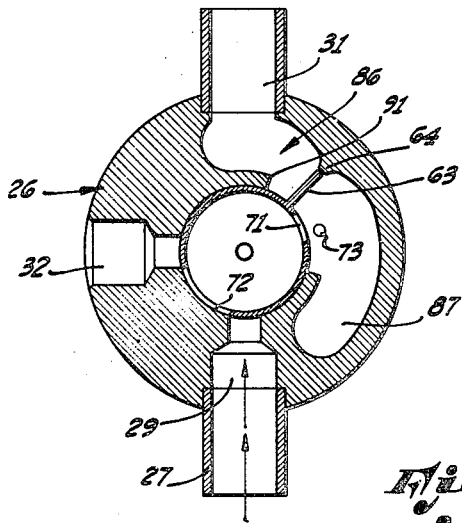

Figures 7, 8 and 9 are diagrammatic views illustrating the paths traversed by gases through the valve of Figures 1 to 6 inclusive when the valve core is in its different optional positions, Figure 7 showing the valve core in neutral position, Figure 8 showing the valve in that position in which gas under pressure is being supplied to the subject, and Figure 9 showing the valve core in the position assumed thereby when the subject is exhaling.

Figure 10:
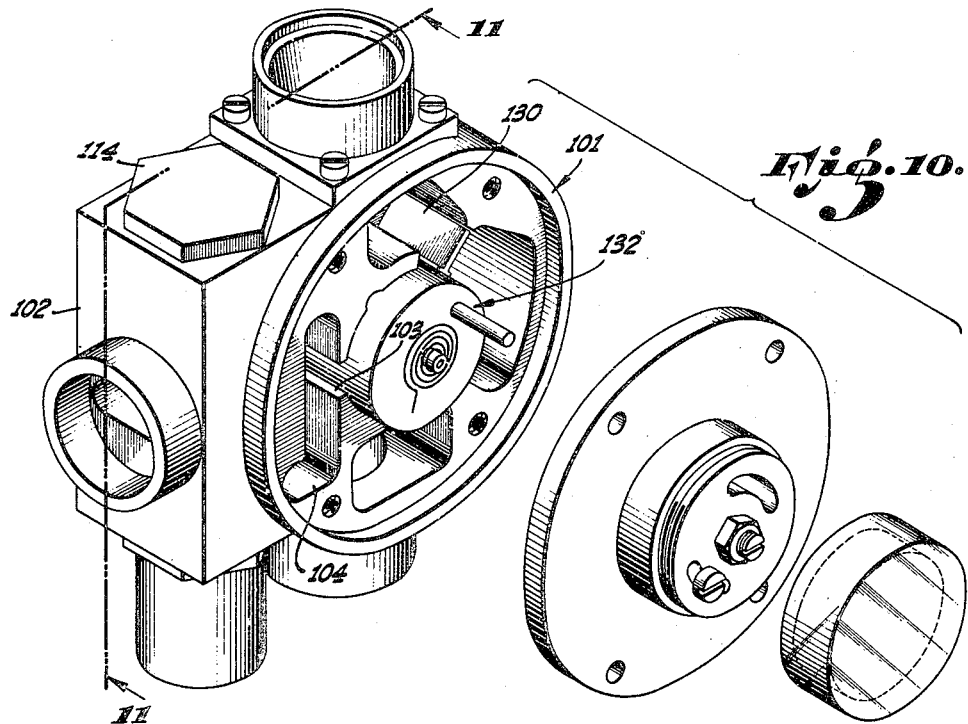

Figure 10 is an exploded perspective view showing a modified form of intermittent pressure-breathing valve.

Figure 11:
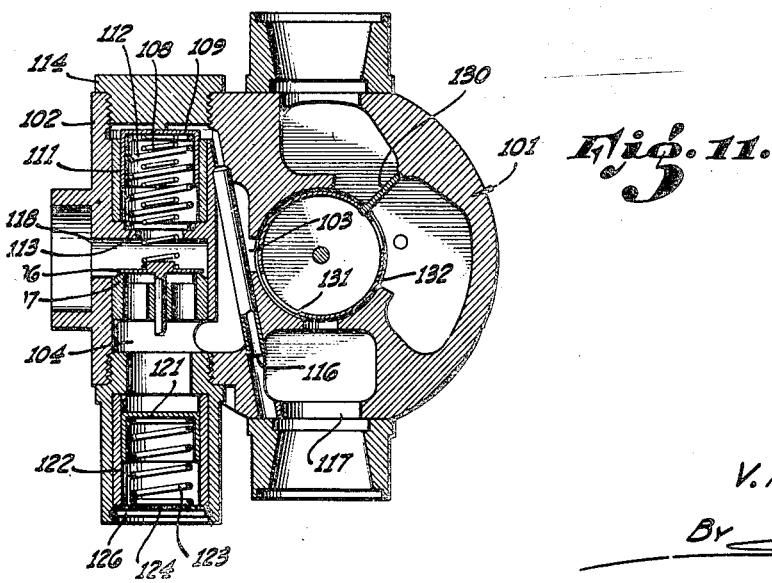

Figure 11 is a transverse, vertical sectional view, the plane of section being indicated by the lines 11—11 of Figure 10 and the direction of view by the arrows.

Figure 12:
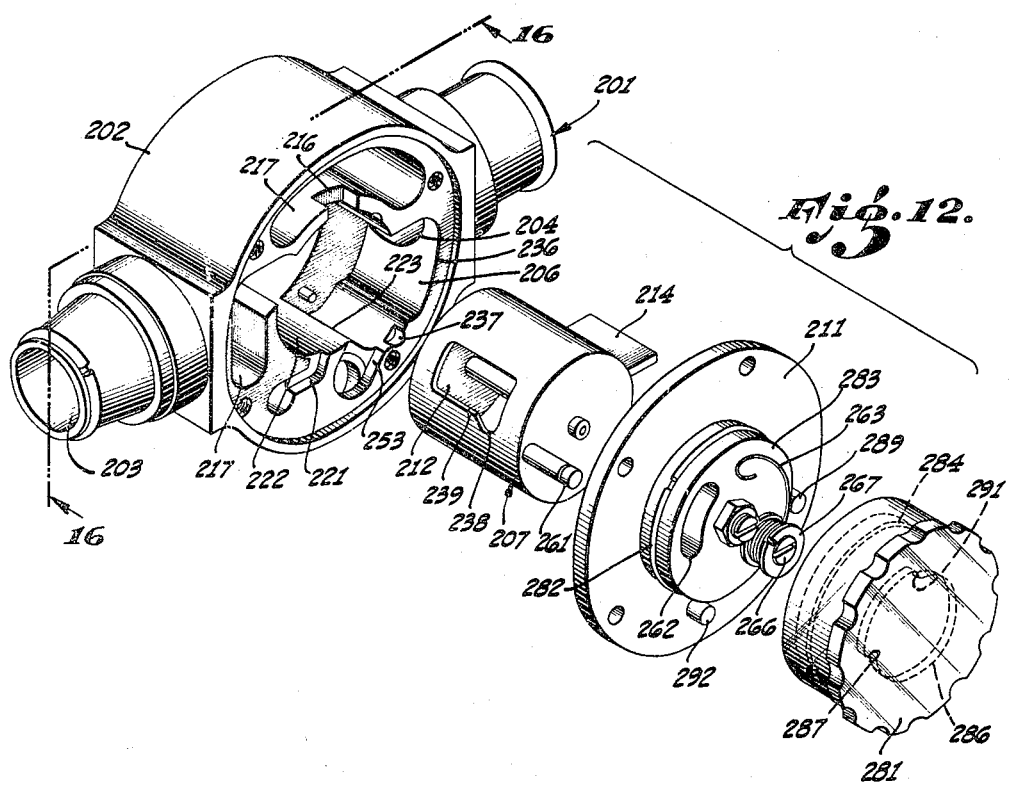

Figure 12 is an exploded perspective view showing a still further modified form of intermittent pressure-breathing valve incorporating the principles of the present invention.

Figure 13:
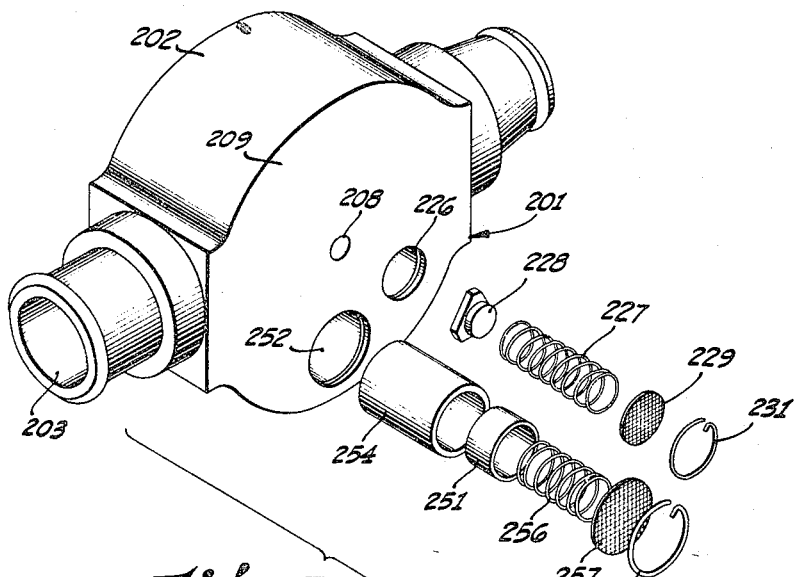

Figure 13 is another exploded perspective view of the valve of Figure 12 showing the opposite side and end of the valve from those illustrated in the former figure.

Figure 14 is a view in side elevation of the valve of Figure 12.

Figure 15 is a view similar to Figure 14, but with the protective cap removed to reveal the structure immediately therebelow, and with portions of the figure broken away to reduce its size.

Figure 16 is a transverse, medial sectional view, the plane of section being indicated by the line 16—16 of Figure 12 and the direction of view by the arrows.

Figure 17 is a longitudinal medial sectional view taken upon the line 17—17 of Figure 16, with the direction of view as indicated.

Figure 18 is a detailed view in longitudinal section taken upon the line 18—18 of Figure 16, with the direction of view as indicated.

Figure 19 is a diagrammatic view used in describing the operation of the spring whereby the valve core is continuously urged toward the expiratory position.

Figure 20 is an exploded view of the intermittent pressure-breathing valve of Figures 12 to 19, inclusive, in operative association with an oxygen mask of known design, the mask being illustrated in vertical medial section and the valve with its cover plate removed to reveal its internal structure, and with the valve core in that position assumed thereby during inhalation by the subject.

Figure 21 is a view similar to the showing of the valve of Figure 20, but with the valve core moved to that position assumed thereby during exhalation.

Figure 22 is an enlarged transverse, vertical, medial sectional view of the compensative exhalation valve which forms a portion of the oxygen mask of Figure 22.

Figure 23 is a schedule of the symbols employed in Figures 20, 21, and 22 in the explanation of the paths traversed by gases in flowing through the valves and oxygen mask of those figures.

Figures 1 to 9 inclusive illustrate one modification of the intermittent pressure-breathing valve of the present invention which, because of the fact that it is the simplest of the three modifications illustrated herein, is the one which will be described first. It comprises a housing 26, having means for connecting thereto a supply of gas to be inhaled. In the modification illustrated, this coupling means is in the nature of a tubular extension 27 over which the end of a tube may be slipped. Preferably diametrically opposite the inlet means 27 is a similar tubular coupling member 28 over which may be slipped the end of a tube for conducting the gas to be inhaled to the subject and the exhaled gases from the subject back into the valve housing 26. For the sake of convenience, therefore, the port 29 with which the coupling member 27 is associated will hereafter be termed the "inlet port," and the port 31 with which the coupling member 28 communicates will be termed the "breathing port."

Preferably at one side of the housing 26 is an outlet port 32 communicating at its outer end directly into the ambient atmosphere. The gas inlet port 29 and the outlet port 32 both communicate at their inner ends, through radially extending passageways 33 and 34, respectively, with a chamber 36 which is of cylindrical form and which preferably is arranged centrally of the housing 26 with its axis extending transversally thereof, i. e., coaxially with respect to the housing 26. The breathing port 31 communicates with the chamber 36 through a passageway 37 of substantially arcuate form and extending circumferentially around the inside of the housing through an arcuate distance of substantially 140°. An opening 38 is formed in the wall 39 of the housing 26 which defines the inner arcuate surface 41 of the passageway 37 and the outer cylindrical surface of the chamber 36. This opening 38 establishes communication between the passageway 37 and the chamber 36, and is of such width that it extends throughout substantially 90° of the wall 39 of the chamber 36.

A valve core 46 of cylindrical form and of only very slightly less diameter than the chamber 36, is mounted coaxially within the chamber 36 for rotary movement about its own axis. The means for so mounting the valve core 46 preferably comprises a pair of axially aligned trunnions 47, 48 the former preferably being stationary, i. e., rigidly mounted upon the associated side wall 49 of the housing 26 and the latter being adjustably carried by the closure cap 51 which defines the opposite side of the housing 26. In order to make the trunnion 48 adjustable, it preferably is in the form of a screw threaded axially through the cap 51 so that its inner end is in position to engage the drum 46 whereas its outer end is accessible and preferably is provided with a suitable screw driver kerf 52. In order to minimize the frictional resistance to movement of the valve core 46 upon the trunnions 47 and 48, it is preferred that each trunnion be provided with a cylindrical extension 53 of relatively small diameter and fitted within a socket 54 in the associated end of the valve core 46, each of these sockets 49 also being of cylindrical form materially longer than the associated cylindrical trunnion extension 48 and so dimensioned with respect to its diameter that the trunnion extension so fits nicely therein for the most nearly frictionless engagement of the valve core 46 thereupon that the limitations of manufacture permit.

The only moveable portion of the IPB valve is a hollow drum 46 preferably composed of very light metal such as aluminum or magnesium. Preferably all of its walls are very thin, the purpose being to minimize its total weight and consequently, its inertia, and thereby enhance its sensitivity to the smallest possible forces tending to impart rotary movement thereto about its own axis. For convenience of manufacture it has been found that to form the drum 46 as a hollow cylinder 61 carried by a shaft 62 extending axially through the drum and having the trunnion sockets 54 formed in its two ends. A vane 63 extends radially outwards from the outer surface of the drum 46. When the drum 46 is mounted within the valve chamber 36 the vane 63 extends through the opening 38 which establishes communication between the valve chamber 36 and the arcuate breathing duct 37; and preferably the vane 63 is only very slightly narrower than the corresponding dimension of the arcuate duct 37 measured in a direction parallel to the axis of the valve core 41. Moreover, the vane 63 is of such length that it leaves only a minimum of clearance between its outer end and a projection 64 extending radially inwards from the outer arcuate surface 66 of the duct 37. Throughout the remainder of its extent and on both sides of the projection 64 the outer surface 66 of the duct or passageway 37 is spaced a greater distance from the path traversed by the outer end of the vane 63 when the valve core 46 turns. It may be seen, therefore, that the projection 64 serves as a restriction in the transverse sectional area of the arcuate passageway 37 and that the restriction thus presented is of such dimension that it is substantially closed when the drum 46 is in that position wherein its vane 63 points directly at the projection 64.

A pair of ports 71 and 72 are formed in the cylindrical wall of the drum 46 and these ports in cooperation with the hollow characteristic of the drum define a passage substantially diametrically through the drum 46. The port 71 is so disposed in the drum 46 that it at all times establishes communication between the interior of the drum 46 and the breathing duct 37 regardless of the position to which the drum turns. The other port 72, however, establishes communication between the interior of the drum and the inlet port 29 when the valve 46 is rotated to that position in which the vane 63 is disposed between the projection 64 and the breathing port 31 (see Figure 8). However, when the drum 46 is rotated to its other extreme of movement as determined by an engagement of the vane 63 with a stop pin 73 rigid with the housing 26, a port 72 establishes communication between the interior of the drum 46 and the outlet port 32. However, also of importance is the fact that the parts are so proportioned and arranged that when the drum 46 is in that position wherein the vane 63 is most closely adjacent the projection 64, this position being substantially half-way between its two extremes of movement, the port 72 of the valve does not register with either the inlet port 29 or the outlet port 32, with the result that the cylindrical wall of the drum 46 effectually closes both the inlet and outlet ports 29 and 32, respectively.

Means are provided for resiliently urging the drum 46 to its neutral position and yieldably retaining it in that position until displaced therefrom by movement of gases within the housing as will be described hereinafter. A spiral or spring 76 having its inner end affixed to the drum 46 encircles one of the protruding ends of the axial rod 62 thereof, and the outer end of the spring 76 seats within a notch 77 in an anchor plate 78 which is slidably mounted upon the inner face of the removable cover cap 51 of the housing 26. The anchor plate 78 is releasably locked in selected position or rotary adjustment about the axis of the valve's rotary movement by means of a screw 79 extending through an arcuate slot 81 in the cap 51. By loosening the screw 79 and then moving it along the slot 81, the anchor plate 78 can be moved about the axis of the valve 46 carrying with it the outer end of the spring 76, with the result that the parts can be so adjusted that the neutral position of the spring, i. e., that position of the spring wherein it is at rest and does not urge the drum to rotate in either direction, can be selected after the valve has been assembled and the housing closed by affixing the cover plate 51 thereto. However, the spring 76 is of very light construction and hence relatively sensitive, permitting the drum valve 46 to rotate in either direction from its neutral position against only the slightest amount of spring resistance, which resistance, however, is ample to return the valve to its neutral position upon cessation of whatever force or forces have caused dislodgement of the valve drum from neutral position.

A pin 82 also is carried by the drum 46, this pin extending from one of the ends of the drum 46 and loosely through another arcuate slot 83 in the cover plate 51, thus exposing the outer end of the pin 82 in such position that it can be engaged by the finger in the event that manual operation of the valve is necessary. A protective cap 84 is provided to cover both the screw 79 and the pin 82, this cap 84, however, being readily removable in case access to either of these elements is desired.

Although the practice of inhalational therapy frequently requires the administration of gases other than oxygen, for the sake of convenience herein, the operation of the IPB valve will be assumed to be concerned with the administration of oxygen. In order to employ the valve, therefore, a supply of oxygen at suitable pressure should be connected to the lower coupling member 27 so that oxygen under pressure is supplied at all times to the inlet port 29. Similarly, a tube for administering oxygen to the subject, such as the supply tube of a conventional oxygen mask, should be connected to the upper coupling 28, with the result that the subject can at all times, by inhaling, receive oxygen through the breathing port 31, and, by exhaling, discharge the exhaled gases through the breathing port. As hereinabove explained, the spring 76 yieldably retains the valve drum 46 with its vane 63 closely adjacent the projection 64. Hence, in the absence of any flow of gases through the housing 26 or of any condition other than that of equalization of gas pressures within the breathing duct 37 on opposite sides of the vane 63, the ports of the drum 46 will assume positions such as those indicated in Figure 7. For the purpose of illustration, let us assume that a cycle of operation is started when the subject begins to inhale. This, of course, will lower the pressure within the breathing port 31 and within that portion 86 of the breathing duct 37 which extends between the breathing port 31 and the projection 64. Owing to the fact that the portion 87 of the breathing duct 37 on the opposite side of the vane 63 is of material volumetric capacity, there is sufficient gas entrapped therein so that the expansion thereof, which follows lowering of the pressure within the upper portion 86 of the breathing duct 37, will result in forcing the vane 63 upwards from that position in which it is illustrated in Figure 7, thus causing the valve drum 46 to rotate in a counter-clockwise direction as viewed on that figure. Preferably the port 72 of the drum 46 is so dimensioned that only a very slight movement of the vane 63 upwards from its Figure 7 position must occur before a portion of the port 72 moves into registry with the inlet port 29; and immediately this occurs oxygen under full pressure will be supplied through the slightly opened ports 29 and 72 through the drum 46 and port 71 into the lower portion 87 of the breathing duct, past the vane 63 into the upper portion of the duct 88 to and through the breathing port 31. The projection 64 presents a restriction in the breathing duct 37 by reducing its cross-sectional area at that point, with the result that the oxygen, in flowing therepast will move with increased velocity. Owing to that fact that the vane 63 projects into the stream of gas at an angle with respect to the direction in which the gas is flowing, this increased velocity likewise increases the tendency for the gas to carry the vane with it to its upper extreme of movement, which is determined by that end 91 of the housing wall 39 which defines the upper limit of the port 38.

It should be emphasized that the end 91 of the wall 39 is so disposed that even when swung upwards far enough to engage the end 91 of the wall 39, the vane still projects angularly into the stream of flowing oxygen, deflecting the gas from the path in which it would flow were the vane 63 otherwise disposed. In this manner, full advantage is taken of the velocity pressure of the flowing gas in moving the vane 63 and the drum 46 from which it extends and to retain the vane and drum in that position in which the oxygen inlet port 29 is fully opened, even though the rate of oxygen flow may be low.

Upon completion of the subject's inhalation, of course, the gases will cease to flow through the valve housing 26, whereupon the velocity of pressure of the gas against the vane 63 will no longer prevail and static pressure upon the opposite faces of the vane will be equalibrated, with the result that the spring 76 then returns the valve 46 and vane to the neutral positions thereof, which are illustrated in Figure 7, wherein the vane 63 is in its closest proximity to the projection 64. However, in the event that the subject starts to exhale before flow of oxygen has ceased, or before the spring 76 has had opportunity to return the drum 46 to its neutral position, another advantage gained as a result of the angular position of the vane 63 when in its uppermost extreme of movement (see Figure 8) becomes manifest. This is that if the vane is still in that position when the direction of gas flow within the breathing duct 87 is reversed, it again is projecting angularly into the stream of flowing gas with respect to the direction of flow with the result that it is highly sensitive to the velocity pressure of the gas which cooperates with the force exerted by the spring 76 in moving the vane 63 and drum 46 from that position in which the oxygen port 29 is open. Consequently, when the subject begins to exhale, much the same operation as that at the beginning of inhalation will occur, but in the opposite direction, i. e., during the initial stage of exhalation the static pressure exerted against the upper face of the vane 63, as the result of the subject's breathing into the oxygen mask, will become sufficiently greater than the static pressure of gas entrapped within the lower portion 87 of the breathing duct, with the result that the vane is pushed downwards, rotating the valve clockwise, as viewed upon Figure 7.

Owing to the fact that the port 72 in the valve 46 is only slightly narrower than the angular distance between the ports 29 and 32, only a very slight clockwise movement of the drum 46 beyond the position in which the vane 63 registers with the projection 64 is required for a portion of the port 72 to register with the outlet port 32 and, since the opposite port 71 in the drum 46 opens into the lower portion 87 of the breathing duct 37, gases exhaled by the subject can escape through the housing 26 to the ambient atmosphere. Immediately upon the commencement of expiratory flow of gases through the housing, the gas impinging against the upper face of the vane 63 will cause the drum 46 to swing to its extreme expiratory position (Figure 9), thus fully opening the outlet port 32 and providing a free passage for exhaled gases. When the subject completes exhaling, gases will cease to flow through the housing and pressures upon opposite faces of the vane 63 again will become equalibrated, whereupon the spring 76 again returns the valve 46 to its neutral position, placing the apparatus in readiness for commencement of the next cycle of operation.

The feature of the manner in which the IPB valve of the present invention operates to which especial attention should be given is the fact that when the drum 46 has completed a very slight clockwise movement from that position wherein its vane 63 registers with the projection 64, the port 72 communicates with the outlet port 32, thus establishing communication between the oxygen mask and the ambient atmosphere by way of the inlet port 31, the breathing duct 37, the port 71 of the drum, the drum's hollow interior, and the port 72. Consequently, it is necessary for the subject to exhale against the pressure to which oxygen was supplied to him during inhalation for only the briefest interval. This interval is only long enough to permit the vane 63 to swing downwards past its neutral position, i. e., its position of registry with the projection 64. Immediately the vane 63 has passed the projection 64, the port 72 will open to the outlet port 32, thus automatically establishing communication between the interior of the oxygen mask and the ambient atmosphere, and permitting the pressure within the mask to drop to a value materially less than that at which oxygen is being supplied to the valve. This permits the major portion of exhalation to be performed with the utmost ease. In fact, after a subject has used an oxygen mask in cooperation with an IPB valve incorporating the principles of the present invention for only a very short time, he becomes so accustomed to its requirement that the initial portion of exhalation be against the pressure of the oxygen being inhaled, that the subject, in most instances, does so without exertion of any conscious effort, and so easily and naturally that the fatigue which heretofore has resulted from exhaling against pressure when being supplied with oxygen at pressure above that of the ambient atmosphere, is almost completely eliminated.

In some instances, it may be desirable to exercise control over the pressure prevailing within the mask during the exhalation period. It is for the purpose of providing such control over the expiratory pressure that the modification of my IPB valve illustrated in Figures 10 and 11, has been designed. In this modification, the valve housing 101 is much the same as that 26 of the previously described modification, its principal difference being that it is provided with an extension 102 at that side thereof through which the exhaust port 103 extends. The port 103 communicates through a passage 104 with the under surface of a spring-loaded valve 106 urged downward against its seat 107 by a spring 108 which is under compression between the upper surface of the valve 106 and a piston 109 which is slidable within a preferably cylindrical chamber 111 in the housing extension. A compensating spring 112 is also engaged under the piston 109, this compensating spring 112 being under compression between the piston 109 and a shoulder 113 formed on the housing extension 102 adjacent the bottom of the chamber 111. A cap 114 threaded into the upper end of the chamber 111 limits upward movement of the piston 109. A by-pass 116 at all times establishes communication between the oxygen inlet port 116 of the housing 101 and the upper portion of the chamber 111 with the result that full pressure of the oxygen being supplied to the apparatus through the port 117 is imposed continuously upon the upper surface of the piston 109. The parts are so proportioned that the oxygen pressure thus imposed upon the piston 109 moves the piston downwards within the chamber 111 thus increasing the force with which the spring 108 presses downward against the valve 106, correspondingly increasing the pressure which the expiratory gases must attain before they can unseat the valve 106 and escape therepast to the atmosphere through an opening 118 in the side of the housing extension 102. However, a portion of the force exerted downwardly by the oxygen against the plunger 109 is absorbed by the compensating spring 112. It is apparent therefore that only the remaining portion of the force exerted by the oxygen against the upper surface of the plunger 109, i. e., that portion of which is not absorbed by the compensating spring 111, is transmitted by the spring 108 to the upper surface of the valve 106. It will be readily understood therefore, that by selection of springs 108 and 112 bearing any desired relationship to each other, the IPB valve of the present invention can be regulated so that the pressure at which the expiratory gases are permitted to escape bear any selected ratio to the pressure at which oxygen is supplied to the inlet port 117. It is readily apparent therefore, that if the pressure at which oxygen is applied to the inlet port 117 is increased the piston 109 will be depressed further within its cylinder 111, thus compressing the spring 109 farther and increasing the force which the spring 109 exerts downwardly against the valve 106. However, inasmuch as a portion of the downward thrust of the gas on the piston 109 is absorbed by the compensating spring 112, the increase in pressure which the spring 109 exerts against the valve 106 is not equal to the increase in pressure of the oxygen at the port 117. Instead, the increase in pressure which the spring 109 exerts in the valve 106 is merely a predetermined proportional part of the increase in the oxygen pressure, that proportion being in the same ratio as the ratio of the strength of the inner spring 109 to that of the outer spring 112.

Another improvement present in the modification illustrated in Figures 10 and 11 which is not present in the previously described modification, is an accumulator piston 121 reciprocably mounted within a cylinder 122 in the lower portion of the housing extension 102. This accumulator piston 121 is urged upward by a spring 123 which is under compression between the piston 121 and a screen 124 retained in position across the otherwise open outer end of the cylinder 122 as by a snap ring 126. The presence of this spring-loaded accumulator increases the effective volumetric capacity of those portions of the interior of the IPB valve wherein gases are called upon to expand and thereby enable the vane to move during the initial phase of movement of the drum from expiratory position toward inspiratory position, and until the drum has turned far enough for its valving port 131 (which corresponds to the port 72 of the first described modification) to register with the oxygen inlet port 117. The purpose of this arrangement is to minimize the resistance to movement of the drum 132 which is offered by the gases trapped behind the vane 131. Were there no portions of the walls of these passages which could yield in response to pressure changes therein, the pressure drop required on the upper surface of the vane in order to move the drum would necessarily be much greater due to the fact that the gases trapped behind the vane would be required to expand to a much greater extent.

Figures 12 to 23 inclusive illustrate a still further modified form of the IPB valve of the present invention. The principal distinction of this modification from those previously described, is that it is more in the nature of a relay inasmuch as it serves to actuate another valve which preferably is mounted in the oxygen mask itself in such a manner that expiratory gases escape to the ambient atmosphere directly from this said other valve instead of being required to pass through the IPB valve itself. The present description of the structure and operation of this modification on my invention therefore, will be facilitated by a brief description of a conventional oxygen mask in connection with which the relay type of my IPB valve is designed to operate.

Figures 20 and 22 illustrate a well-known type of oxygen mask 150 now in common use. It comprises a rubber body portion 151 defining a breathing chamber 152 having openings 153 and 154 therein, through which the subject's nose and mouth, respectively, communicate with the chamber 152. Preferably the lateral edges of the body 151 are defined by soft rubber flaps 156 integral with the remainder of the body portion 151. An oxygen inlet passage 157 is provided on the front of the mask, being separated from the chamber 152 by a partition 158. A check valve 159 at the upper end of the oxygen inlet passage 157 permits oxygen to flow into the chamber 152, as indicated by the heavy black arrows but prevents reversal of flow from the chamber 152 back into the passage 157. The passage 157 communicates at its lower end with an oxygen supply tube 161 to the lower end of which the relay type IPB valve 162 of my invention is connected.

The bottom of the breathing chamber 152 is defined by a substantially horizontal partition 166 which serves to support a compensated expiratory valve 167 indicated in its entirety at 167. This valve when open establishes communication between the breathing chamber 152 and an outlet chamber 168 which communicates with the ambient atmosphere through an opening 169 in the outer end of a flexible tubular extension 161. The outlet chamber 168 is separated from the oxygen supply passage 157 by another substantially horizontally extending partition 176.

The compensated expiratory valve 167 comprises a housing 178 having a peripheral groove 179 within which the edges of the partition 166 meet so as to mount the housing 178 upon the partition 166. The top 181 of the housing 178 is provided with a central aperture 182 communicating with a tube 183 extending downward from the top 181 and having a valve seat 184 at its lower end. Cooperative with the valve seat 184 is a flexible diaphragm 186 extending across the housing 181 below the valve seat 184 but sufficiently closely adjacent thereto to enable it to engage and effectually close the lower end of the tube 183 when the diaphragm 186 is flexed upward slightly. Another diaphragm 191, which is called the "compensating diaphragm" inasmuch as it is responsive to fluctuations of pressure within the oxygen supply passage 167, also extends across the housing 181 below the valving diaphragm 186. A coil spring 192 is under compression between the two diaphragms; and the lower, compensating diaphragm serves to support the spring 192 which in turn urges the valving diaphragm 186 upward into that position in which it closes the lower end of the tube 182. The bottom 193 of the housing 181 carries a tube 194 which extends through the partition 176 into the oxygen supply passage 157. The bore 196 of the tube 194 establishes communication at all times between the oxygen supply passage 157 and the interior of the valve housing 181 below the compensating diaphragm 191, with the result that the pressure prevailing against the under surface of the compensating diaphragm 191 is at all times equal to the pressure within the oxygen supply passage 157. Inasmuch as the compensating diaphragm 191 supports the spring 192 it is desirable to provide a spring 197 under compression between the under surface of the compensating diaphragm 191 and a shoulder 198 in a bore 196 of the tube 194.

The parts of the compensated expiratory valve 167 are so proportioned with respect to each other that when the pressure exerted upwards against the compensating diaphragm 191 is greater than the pressure exerted downward through the tube 183 against the valving diaphragm 186, the diaphragm 186 will close the lower end of the tube 183; but when the pressure exerted downwards through the tube 183 is greater than that exerted upwards against the lower, compensating diapragm the valving diaphragm 186 will be pushed downwards sufficiently to open the lower end of the tube 183 and thus permit gases to escape from the tube 183 through an opening 199 in the side wall of the housing 178 below the supporting partition 166, i. e., into the outlet chamber 168 and thence through the opening 169 to the ambient atmosphere.

The construction and operation of the relay type of IPB valve will be facilitated by reference to Figure 12 to 16 inclusive. Here again the valve, which is indicated in its entirety at 201, comprises a housing 202 having an oxygen inlet port 203, a breathing port 204 communicating with a breathing duct 206, and a drum 207 mounted for rotary movement about its own axis as by a pair of axially aligned trunnions 208, one of which is carried by the fixed wall 209 of the housing 202 while the other is carried by a removable cover plate 211 which constitutes the opposite side wall of the housing 202. As in the previously described modification, the drum 207 is of hollow, cylindrical form and has a pair of circumferentially spaced ports 212 and 213 which are so located that they are adapted to register, respectively, with the oxygen inlet port 203 and the breathing duct 206, and thereby establish relatively unrestricted communication, when the drum 207 is rotated to its Figure 20 position, between the port 203 and the oxygen mask 150, it being understood that the oxygen supply passage 157 of the mask 150 should be connected to the breathing port 204 as by an oxygen supply tube 213 of conventional design. However, when the drum 207 is turned so as to swing its actuating vane 214 downwards to the position illustrated in Figure 21, then the port 212 of the drum no longer registers with the oxygen inlet port 203 with the result that the supply of oxygen through the IPB valve 201 is cut off. When the drum is in this last-mentioned position, however, the port 212 does register with a passage 216 which opens into a chamber 217 and thereby increases the volume of gas which can expand to enable the vane 214 to move upwards again from its Figure 21 position. The chamber 217, therefore, serves merely as a reservoir to contain a supply of gas subject to expansion when the vane 214 starts to move upward. This chamber 217, although it occupies a position in its housing 202 corresponding to that of the exhaust passage 104 of the modification of Figure 10 and 11, does not communicate with the exterior of the housing 202. Instead, communication is established between the breathing duct 206 and the ambient atmosphere when the drum 207 is in its Figure 21 position, through a relatively small passage 221, the inner end of which enters the drum chamber 222 in such position that the port 213 of the drum communicates therewith. Moreover, the inner end of the passage 221 is spaced at such a distance from the opening 223 of the drum chamber 222 through which the vane 214 extends, that the port 213 of the drum 207 registers with both the inner end of the passage 221 and a portion of the opening 223 only when the drum is turned fully to expiratory position, as illustrated in Figure 21. The outer end of the passage 221 communicates with the inner end of a chamber 226 (see Figure 18) containing a coil spring 227 under compression between a valve 228 and a screen 229 which is held in place in the outer end of the chamber 226 as by a snap ring 231. The spring 227 yieldably presses the valve 228 against a shoulder 232 adjacent the inner end of the chamber 226. This valve 228, therefore operates as a pressure-relief valve permitting gases to escape therepast through the chamber 226 but only until the pressure within the passage 157 has dropped to a predetermined value above the pressure of the ambient atmosphere.

Small though the passage 221 is, it is of ample size to serve the purpose for which it is designed; it being borne in mind that the modification of the IPB valve here being described is in reality a relay valve and that the expired gases do not escape to the ambient atmosphere by passing through the valve 201 itself. Instead, the function of the passageway 221 and the outlet chamber 226 is merely to permit a relatively small volume of gas to escape from the breathing duct 206 and oxygen supply passage 157 and thereby lower the pressure therein to the value determined by the strength of the spring 227. It is evident, therefore, that by changing the design of the spring 227, the value to which the pressure within the passage 157 must drop before the valve 228 closes is similarly altered. Thus it may be seen that facile means are provided for regulating the pressure to which the subject can exhale. This makes provision for various exhalation pressures to meet different physiological requirements. Consequently, the relay type 201 of the IPB valve possesses the advantage that it not only permits intermittent pressure breathing, but it also controls the pressure at which the subject exhales.

As in the previously described modification, the breathing duct 206 is provided with a restriction which in this modification is in the nature of a shoulder 236 and a portion 237 of the outer wall of the breathing duct 206 which is of reduced radius, measured from the axis about which valving drum 207 oscillates. This radius is only slightly greater than the radius measured to the extreme outer edge of the vane 214 with the result that only sufficient clearance is established between the outer edge of the vane 214 and the portion 237 of the housing, to permit freedom of movement of the vane with a minimum of leakage of gas therearound. Consequently, when the drum 207 is in expiratory position a relatively small volume of oxygen can escape to that side of the vane 214 which is farther from the breathing port 204 by flowing through a comparatively small recess 237 (see Figures 12 and 21) in the portion 236 of the housing of reduced radius as hereinabove explained. The passage 237 permits only a sufficient quantity of gas to escape to lower the pressure within the oxygen supply passage 157 to an extent which allows opening of the compensated exhalation valve 167 and thereby prevent any unnecessary wastage of oxygen.

The parts are so proportioned that it is necessary for the drum 207 to rotate only a relatively small angular distance from its Figure 21 position before the port 212 of the drum "cracks" the oxygen inlet port 203, thereby permitting oxygen at full pressure to enter through the drum an into that portion of the breathing duct 206 which is beyond the vane 214 from the breathing port 204. However, such initial opening of the port 212 to the oxygen supply port 203 is not through the entire width of the port 212 but through merely a relatively narrow notch 238 (see Figure 12). The location of the bottom of the notch 238 actually determines the position for the associated edge of the port 212 as far as the timing of the valve port is concerned; but, in order to prevent undue leakage of oxygen past this edge of the valve port 212 when the port 212 is closed, a portion 239 of that edge thereof which controls oxygen flow is permitted to remain considerably above the bottom of the notch 238 when the port 212 is formed. The portion 239 extends throughout the larger portion of the width of the port 212, whereas the notch 238 is relatively narrow.

This modification 201 of my IPB valve is provided with an accumulator piston 251, the structure and function of which are similar to those of the accumulator piston 121 of the modification illustrated in Figure 11. The accumulator piston 251 (see Figures 13 and 17) is reciprocably mounted within a cylindrical recess 252 communicating at its inner end through a short passageway 253 (see Figure 12) with the breathing duct 206. The recess 252 is preferably provided with an accurately machined liner 254 to which the piston 251 is nicely fitted. A coil spring 256 is interposed between the piston 251 and a screen 257 which is releasably retained within the open outer end of the recess 252 as by a snap ring 258.

A pin 261 rigid with and eccentrically mounted upon the valve drum 207 extends laterally therefrom through an arcuate slot 262 in the cap 211 where it is engaged by a spring 263 which constantly urges the pin 261 to rotate to expiratory position. The spring 263 has been especially designed to exert either a constant torque on the pin 261, or a torque which decreases as the drum is rotated against the action of the spring 263. The position which the pin 261 and the spring 263 occupy when the drum 207 is in expiratory position is illustrated in full lines in Figure 19; whereas the position which these parts occupy when in inspiratory position is indicated in broken lines. The end of the spring 263 opposite that which engages the pin 261 is wound upon a small drum 267 held rigidly in place upon the outer surface of the cap 211 as by a suitable screw 266, the direction of such winding being opposite that in which the drum is urged to turn by the spring 263. In other words, when the drum is turned against the action of the spring 263, a greater amount of the spring is wound on the drum 264, thus shortening the length of that portion of the spring which acts as a cantilever arm exerting torque against the pin 261, and developing the tendency to pull the pin 261 inwards toward the drum 207.

In rotating the drum against the action of the spring 263, i. e., from the full line to the broken line position the pin 261 rotates through the angle b and about the axis 271 of the drum. When the parts are in the full line position, the force exerted by the spring against the pin is represented by $W_1$ and its effective moment of rotation of the drum is $W_1 \times L_1$, but when the parts are in their broken line position, the effective moment of rotation exerted by the spring on the drum is $W_2 \times L_2$. The force $W_2$ is maintained substantially parallel to that of the force $W_1$ instead of being normal to the radius $r_3$, due to the wrapping action of the spring around its supporting drum 264. Consequently, the effective length of the circular cantilever arm is shortened, producing a force pulling toward the axis 272 of the drum, as already explained. $W_2$ is the resultant of this extra force and the normal force which is perpendicular to a line which lies between the dotted line position of the pin 261 and the center of a circle to which the force exerted against the pin 261 is tangent. This extra force can be increased by pre-forming the circular cantilever arm so that it will exert this pulling-in tendency in all positions.

Although the spring force $W_2$ is greater than $W_1$ the effective leverage exerted against the pin about the axis 272 is actually less than $L_1$ and is represented by the distance $L_2$. Consequently, it is possible to proportion and arrange the parts in such a manner that $W_1 \times L_1$ is equal to $W_2 \times L_2$, thereby maintaining a substantially constant torque regardless of the position to which the drum may be swung within the limits of the drum's rotation as determined by the arcuate length of the slot 262. In fact, the spring 263 can be so formed that the direction of the resultant force $W_2$ can be made to pass even nearer the axis 271 of the drum, thereby reducing $L_2$ even further so that $W_2 \times L_2$ is actually less than $W_1 \times L_1$. Under such circumstances, the torque exerted by the spring against the drum actually diminishes as the spring is tightened.

A constant or diminishing torque spring arrangement is of especial value in this connection because it reduces the pressure drop of the oxygen in flowing past the vane 214. Of course, the greater the force which urges the vane to swing back against the tendency for the flowing oxygen to push the vane to full oxygen flow position, the greater will be the tendency for the vane to restrict the flow of oxygen. Therefore, by reducing the force that swings the vane against the flowing oxygen, the less will be the interference offered by the vane to the flow of oxygen.

A cap 281 is removably mounted upon the outer surface of the cover plate 207 in position to enclose the outer end of the pin 261, the spring 262, and the spring-supporting drum 264. This cap 281 is releasably and rotatably retained upon the cover plate 211 as by a snap ring 282 in the circumferential surface of a cylindrical projection 283, the ring 282 fitting within a groove 284 in the inner circumferential surface of the cap 281 which fits over the projection 283. A cylindrical recess 286 formed in the inner surface of the outer end of the cap 281 has an arcuate recess 287 formed at one side thereof and the pin 261 is free to oscillate within the arcuate recess 287. However, the arcuate length of the recess 287 is such that when the cap 286 is turned far enough to bring a projection 288 on the cap into engagement with a pin 289 on the cover 211, the end 291 of the arcuate recess 287 will engage the pin 261 and turn the drum 207 to full oxygen flow position. However, by turning the cap 281 in the opposite direction until the projection 288 engages another stop pin 292 on the cap 211, the pin 261 is released for freedom of movement without restriction from the cap 281. When the cap 281 is in its Figure 14 position, therefore, the valve 201 operates as an intermittent pressure breathing valve; on the other hand, when the cap 281 is turned in a counter-clockwise direction until the projection 288 engages the stop 289, oxygen will be admitted to the mask 250 at full pressure and without interruption. Hence this control permits the optional use of intermittent pressure breathing or continuous pressure breathing.

For normal operation the valve 201 should have the cap 281 turned to its Figure 14 position wherein the movement of the pin 261 is not restricted. The subject can then inhale oxygen under pressure and exhale against reduced pressure the operation of the valve 201 resulting entirely from the subject's own normal breathing actions. When the subject inhales, the pressure within the oxygen supply passage 157 and the breathing duct 206 is lowered whereupon the pressure of the gases expanding within the reservoir 217 and the hollow interior of the drum 207 serving to force the vane 214 in counter-clockwise movement from the Figure 21 position until the vane 214 passes the shoulder 236 at which time the port 212 will register sufficiently with the oxygen inlet port 203 to permit oxygen at full pressure to flow into the valve. This so increases the pressure behind the vane 214 that the drum 207 is rotated to full-flow position as illustrated in Figure 20. When the subject terminates inhalation, flow of oxygen through the valve will cease, whereupon the spring 263 will return the drum 207 to the position shown in Figure 21.

However, the smallest amount of continued flow into the mask and lungs of the subject will hold the vane 214 in a slightly open position, as shown by the broken lines in Figure 20. The vane is held in this position by the continued flow because of the very small clearance between the vane and the housing projection 236 which could not accommodate even the small flow in question. By this arrangement, the valve will normally remain open until the subject initiates an expiratory effort. This effort will raise the pressure within the mask, which in turn will block all flow from the passage 157 through the inlet valves 159. The instant flow through the valve stops, the vane and drum will be urged to the position as shown in Figure 21. In this position the pressure of oxygen entrapped within the passage 157 will be permitted to bleed out through the relief valve 232, as shown by the small black arrows, Figure 21. The pressure will thus fall away to the relief pressure determined by the strength of the spring 227 and consequently, the pressure exerted upwards against the under surface of the compensating diaphragm 191 will be reduced. This in turn permits the subject to exhale through the compensated valve against a correspondingly reduced pressure. When the subject begins to inhale again, the pressure within the oxygen supply passage 157 is reduced, thus permitting the gases trapped within the reservoir 217 and the drum 207 again to expand, moving the vane 214 upwards from their Figure 21 position, and commencing another cycle of respiration.

Thus it may be seen that the actuation of the valve is completely under the control of the subject and responsive to his normal respiratory efforts. In fact, after the valve has been in use for a short period, the subject becomes so used to the slight increase in pressure necessary to start inspiratory action that his operation of the valve no longer requires any conscious effort on his part. In contrast to continuous pressure breathing, it is much more comfortable and less fatiguing; and tests under operating conditions upon both humans and animals, and both at ground levels and at simulated altitudes up to 50,000 feet indicate other physiological values.

The valve is also of value in administering oxygen and other gases to a subject who is unable to actuate the valve for himself. For example, the valve is very valuable in resuscitating an unconscious subject who has ceased to breathe. When so employed, the cap 281 should be removed and an operator should move the pin 261 back and forth in the proper periodicity to force oxygen into the subject's lungs, and to permit expiration at that rate which will provide the optimum ventilation of the subject's lungs.

I claim:

1. In intermittent pressure breathing apparatus, a device for controlling gas flow comprising a housing having a gas inlet port, an outlet port, a breathing port, and a breathing duct communicating with said breathing port, a valve within said housing movable optionally to inspiration position connecting said breathing duct to said inlet port, to expiration position connecting said breathing duct to said outlet port, or to neutral position wherein said inlet and outlet ports are both closed, and means actuated by gas moving within said breathing duct toward said breathing port for moving said valve to said inspiration position and by gas moving within said breathing duct away from said breathing port for moving said valve to said expiration position, said valve-moving means during the initial phase of the movement of said valve from said neutral position being actuated by the static pressure of said gas and, during the final stage of said movement being actuated by the velocity pressure of said gas.

2. In intermittent pressure breathing apparatus, a device for controlling gas flow comprising a housing having an inlet port, an outlet port, a breathing port, and a breathing duct communicating with said breathing port, a valve within said housing movable optionally to inspiration position connecting said breathing duct to said inlet port or to expiration position connecting said breathing duct to said outlet port, means actuated by gas moving in one direction within said breathing duct for moving said valve to said inspiration position and by gas moving in the opposite direction within said breathing duct for moving said valve to said expiration position, said valve-moving means being actuated by both static pressure and velocity pressure of said gas, and means operative upon cessation of flow within said duct for returning said valve to neutral position between said inspiration and expiration positions.

3. In intermittent pressure breathing apparatus, a device for controlling gas flow comprising a housing having an inlet port, an outlet port, a breathing port, and a breathing duct communicating with said breathing port, a valve within said housing movable optionally to inspiration position connecting said breathing duct to said inlet port or to expiration position connecting said breathing duct to said outlet port, means actuated by gas moving in one direction within said breathing duct for moving said valve to said inspiration position and by gas moving oppositely within said breathing duct for moving said valve to said expiration position, said valve-moving means being actuated by both static pressure and velocity pressure of said gas, means operative upon cessation of flow within said duct for returning said valve to neutral position between said inspiration position and said expiration position, and means for adjusting said valve-returning means to shift said neutral position to which it returns said valve.

4. In intermittent pressure breathing apparatus, a device for controlling gas flow comprising a housing having an inlet port, an outlet port, a breathing port, and a breathing duct communicating with said breathing port, a valve within said housing movable optionally to inspiration position connecting said breathing duct to said inlet port or to expiration position connecting said breathing duct to said outlet port, means actuated by gas moving in one direction within said breathing duct for moving said valve to said inspiration position and by gas moving oppositely within said breathing duct for moving said valve to said expiration position, said valve-moving means being actuated by both static pressure and velocity pressure of said gas, and a spring resiliently urging said valve to position between said inspiration and expiration positions with a force only slightly greater than the frictional force resisting movement of said valve.

5. In intermittent pressure breathing apparatus, a device for controlling gas flow comprising a housing having a valve chamber therein, an inlet port and an outlet port communicating with said chamber in spaced apart relationship, and a breathing port communicating through a duct with said chamber, a valve within said chamber and having a passage therethrough communicating at one end with said duct, said valve being movable to bring the other end of said passage optionally into communication with said inlet port, into communication with said outlet port, or into neutral position disconnected from both of said ports, and means for actuating said valve and extending into said duct so as to be moved by gas flowing therein.

6. In intermittent pressure breathing apparatus, a device for controlling gas flow comprising a housing having a valve chamber therein, an inlet port and an outlet port communicating with said chamber in spaced apart relationship, and a breathing port communicating through a duct with said chamber, a valve movable within said chamber and having a passage therethrough communicating at one end with said duct, said valve being movable to bring the other end of said passage optionally into communication with said inlet port, into communication with said outlet port, or into neutral position disconnected from both of said ports, means for actuating said valve and extending into said duct so as to be moved by gas flowing therein, and means restricting the cross-sectional area of said duct adjacent the position therein occupied by said valve-actuating means when said passage is in its said neutral position whereby movement of said valve from said neutral position is initiated by pressure head of gas in said duct prior to the development of sufficient velocity head to actuate said valve-operating means.

7. In intermittent pressure breathing apparatus, a device for controlling gas flow comprising a housing having a valve chamber therein, an inlet port and an outlet port communicating with said chamber in spaced apart relationship, and a breathing port communicating through a duct with said chamber, a valve within said chamber and having a passage therethrough communicating at one end with said duct, said valve being movable to bring the other end of said passage optionally into communication with said inlet port, into communication with said outlet port, or into neutral position disconnected from both of said ports, means extending into said duct so as to be moved by gas flowing therein for actuating said valve, and spring means associated with said valve for returning said passage to said neutral position upon cessation of flow within said duct.

8. In intermittent pressure breathing apparatus, a device for controlling gas flow comprising a housing having a valve chamber therein, an inlet port and an outlet port communicating with said chamber in spaced apart relationship, and a breathing port communicating through a duct with said chamber, a valve within said chamber and having a passage therethrough communicating at one end with said duct, said valve being movable to bring the other end of said passage optionally into communication with said inlet port, into communication with said outlet port, or into neutral position disconnected from both of said ports, means extending into said duct so as to be moved by gas flowing therethrough for actuating said valve, spring means associated with said valve for returning said passage to said neutral position upon cessation of flow within said duct, and means for adjusting said spring to vary the position to which it urges said valve.

9. In intermittent pressure breathing apparatus, a device for controlling gas flow comprising a housing having a valve chamber therein, an inlet port and an outlet port communicating with said chamber in spaced apart relationship, and a breathing port communicating through a duct with said chamber, a valve within said chamber and having a passage therethrough communicating at one end with said duct, said valve being movable to bring the other end of said passage optionally into communication with said inlet port, into communication with said outlet port, or into neutral position disconnected from both of said inlet and outlet ports, means extending into said duct so as to be moved by gas flowing therein for actuating said valve, means restricting the cross-sectional area of said duct adjacent the position therein occupied by said valve-actuating means when said passage is in its said neutral position whereby movement of said valve from said neutral position is initiated by pressure head of gas in said duct prior to the development of sufficient velocity head to actuate said valve-operating means, and spring means associated with said valve for returning said passage to said neutral position upon cessation of flow within said duct.

10. In intermittent pressure breathing apparatus, a control device comprising a housing having an inlet port, an outlet port, and a breathing duct therein, means actuated by pressure variation within said breathing duct for connecting said breathing duct optionally with either of said ports, and means associated with said outlet port and actuated by gas pressure within said inlet port for controlling escape of gas through said outlet port at pressure less than but bearing a predetermined ratio to that prevailing within said inlet port.

11. In intermittent pressure breathing apparatus, a control device comprising a housing having an inlet port, an outlet port communicating with the ambient atmosphere, and a breathing duct therein, means actuated by pressure variation within said breathing duct for connecting said inlet port to a supply of gas under pressure above that of the ambient atmosphere, and means for controlling escape of expired gas through said outlet port at pressure less than but bearing a predetermined ratio to the pressure of said gas, said controlling means comprising a valve normally closing said outlet port and movable by said expired gas to open said outlet port, and means for yieldably holding said valve closed.

12. In intermittent pressure breathing apparatus, a control device comprising a housing having an inlet port, an outlet port communicating with the ambient atmosphere, and a breathing duct therein, means actuated by pressure variation within said breathing duct for connecting said inlet port to a supply of pressurized gas, and means for controlling escape of expired gas through said outlet port at pressure less than but bearing a predetermined ratio to that of said pressurized gas, said controlling means comprising a valve normally closing said outlet port and movable by said expired gas to open said outlet port, a spring urging said valve closed, and means responsive to the pressure of said pressurized gas for increasing the force of said spring.

13. In intermittent pressure breathing apparatus, a control device comprising a housing having an inlet port, an outlet port and a breathing duct therein, means operable in response to variation in pressure within said duct for connecting said breathing duct optionally with either of said ports, means providing a resiliently expansible chamber communicating with said outlet port, and a check valve restricting flow from said housing until pressure exerted thereagainst by expired gas within said housing exceeds a predetermined value.

14. In intermittent pressure breathing apparatus, a device for controlling gas flow comprising a housing having an inlet port, an outlet port, a breathing port, and a breathing duct communicating with said breathing port, a valve within said housing rotatable optionally to inspiration position connecting said breathing duct to said inlet port or to expiration position connecting said breathing duct to said outlet port, means actuated by gas moving in one direction within said breathing duct for moving said valve to said inspiration position and by gas moving in the opposite direction within said breathing duct for moving said valve to said expiration position, said valve-moving means being actuated by both static pressure and velocity pressure of said gas, and a pin rigid with said valve and arranged eccentrically thereon with respect to said valve's axis of rotation, a drum carried by said housing, and a spring having one end wound upon said drum and its other end extending tangentially therefrom into engagement with said pin whereby said spring urges said drum to said expirating position thereof, said drum being mounted on said housing at a point radially spaced from said axis and angularly spaced substantially 180° about said axis from the position to which it is urged by said spring whereby the effective moment of rotation of said drum exerted by said spring is decreased as said valve is rotated against the action of said spring.

15. In intermittent pressure breathing apparatus, a device for controlling gas flow comprising a housing having an inlet port, an outlet port, a breathing port, and a breathing duct communicating with said breathing port, a valve within said housing rotatable optionally to inspiration position connecting said breathing duct to said inlet port or to expiration position connecting said breathing duct to said outlet port, means actuated by gas moving in one direction within said breathing duct for moving said valve to said inspiration position and by gas moving in the opposite direction within said breathing duct for moving said valve to said expiration position, said valve-moving means being actuated by both static pressure and velocity pressure of said gas, a pin rigid with said valve and arranged eccentrically thereon with respect to said valve's axis of rotation, a drum carried by said housing, and a spring having one end wound upon said drum and its other end extending tangentially therefrom into engagement with said pin whereby said spring urges said drum to said expirating position thereof, said drum being mounted on said housing at a point radially spaced from said axis and angularly spaced substantially 180° about said axis from the position to which it is urged by said spring whereby the effective moment of rotation of said drum exerted by said spring is decreased as said valve is rotated against the action of said spring, and said drum being rigidly affixed to said housing whereby rotation of said valve against the action of said spring is accompanied by winding an increased amount of said spring upon said drum and a corresponding decrease in the length of the portion of said spring which extends from said drum to said pin.

16. In intermittent pressure breathing apparatus, a device for controlling gas flow comprising a housing having a gas inlet port, an outlet port, a breathing port, and a breathing duct communicating with said breathing port, a valve within said housing movable optionally to inspiration position connecting said breathing duct to said inlet port, to expiration position connecting said breathing duct to said outlet port, or to neutral position wherein said inlet and outlet ports are both closed, means actuated by gas moving within said breathing duct toward said breathing port for moving said valve to said inspiration position and by gas moving within said breathing duct away from said breathing port for moving said valve to said expiration position, said valve-moving means during the initial phase of the movement of said valve from said neutral position being actuated by the static pressure of said gas and, during the final stage of said movement being actuated by the velocity pressure of said gas, and means for controlling the pressure at which gas escapes from said housing through said outlet port.

V. RAY BENNETT.

REFERENCES CITED

The following references are of record in the file of this patent:

UNITED STATES PATENTS

| Number | Name | Date |
| --- | --- | --- |
| 122,544 | Westinghouse | Jan. 9, 1872 |
| 1,145,601 | Lemoine | July 6, 1915 |
| 1,553,940 | Kangieser | Sept. 15, 1925 |
| 1,637,085 | Nichols | July 26, 1927 |
| 1,640,552 | Nelson | Aug. 30, 1927 |
| 2,268,172 | Sinnett | Dec. 30, 1941 |
| 2,269,904 | Erickson | Jan. 13, 1942 |
| 2,310,189 | Deming | Feb. 2, 1943 |
| 2,378,123 | Deming | Oct. 16, 1945 |